F. H. LOPEZ.
TIRE STRUCTURE.
APPLICATION FILED SEPT. 22, 1917.
1,272,476.
Patented July 16, 1918.
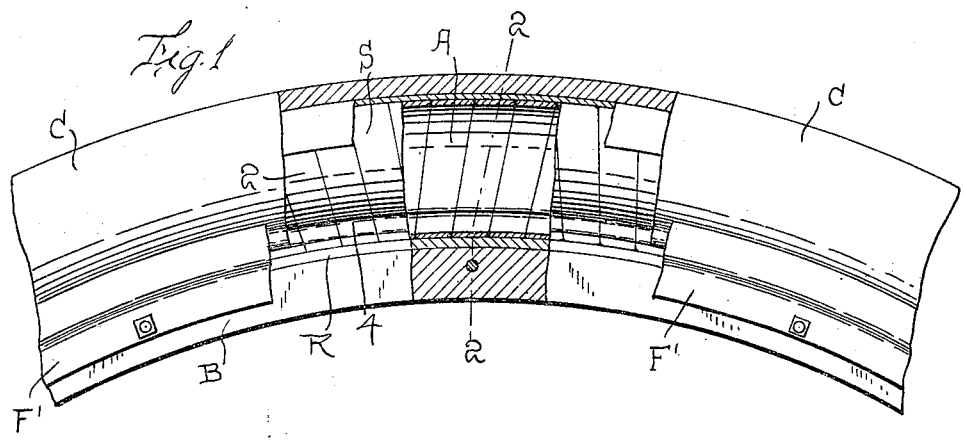
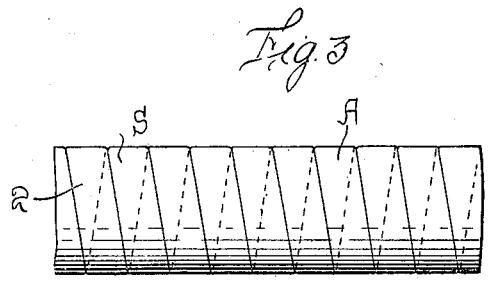
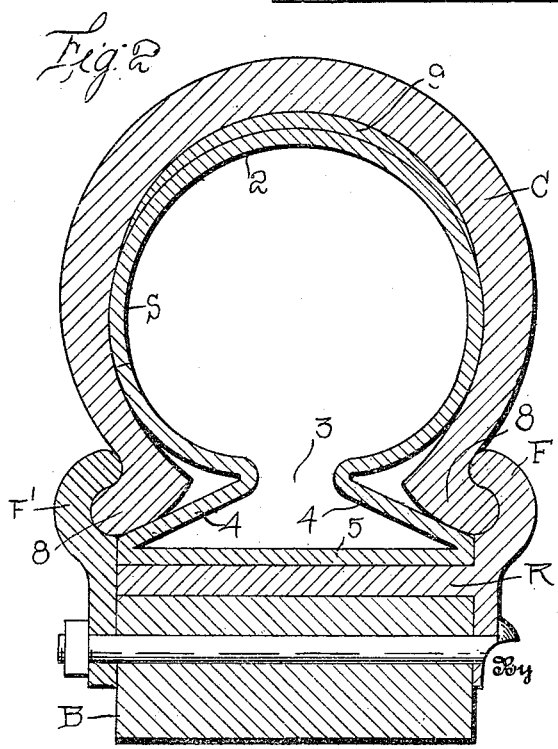
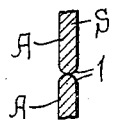
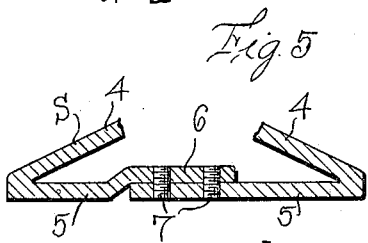
Inventor
FRANK H. LOPEZ
By Watson E. Coleman
Attorney

UNITED STATES PATENT OFFICE.

FRANK H. LOPEZ, OF CUMMING, CALIFORNIA.

TIRE STRUCTURE.

1,272,476.  Specification of Letters Patent.  Patented July 16, 1918.

Application filed September 22, 1917. Serial No. 192,730.

*To all whom it may concern:*

Be it known that I, FRANK H. LOPEZ, a citizen of the United States, residing at Cumming, in the county of Mendocino and State of California, have invented certain new and useful Improvements in Tire Structures, of which the following is a specification, reference being had to the accompanying drawings.

This invention relates to certain improvements in tire structures and it is an object of the invention to provide a novel and improved device of this general character wherein is employed a continuous coil spring so arranged as to afford a maximum of resiliency.

The invention consists in the details of construction and in the combination and arrangement of the several parts of my improved tire structure wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein—

Figure 1 is a fragmentary view partly in elevation and partly in section illustrating a tire constructed in accordance with an embodiment of my invention and in applied position;

Fig. 2 is an enlarged sectional view taken substantially on the line 2—2 of Fig. 1;

Fig. 3 is a fragmentary view in plan of the spring as herein embodied;

Fig. 4 is an enlarged detail sectional view illustrating the construction of adjacent margins of the convolutions of the spring; and Fig. 5 is an enlarged detail sectional view illustrating the connected ends of the spring as herein set forth.

As disclosed in the accompanying drawings B denotes the felly of a wheel having affixed thereto a rim R including the permanent flange F and the removable flange F'. Operatively engaged with the flanges F and F' is the carcass C which substantially surrounds my improved core or spring S.

The spring S is continuous and is formed of a relatively broad strip of material bent to form a series of closely adjacent convolutions A with the adjacent margins of said convolutions rounded as at 1 so that said convolutions A may have relative movement with a minimum of resistance.

Each of the convolutions A comprises a substantially circular portion 2 having its inner portion slightly separated as at 3 and continued by the outwardly diverging extensions 4 terminating in the transversely disposed base portion 5. The convolutions A are arranged in continuity and the free ends of the strip from which the spring S is formed are arranged in overlying relation as at 6 and disposed through said overlying portions are the removable holding screws 7 as particularly illustrated in detail in Fig. 5.

The bend or junction between the diverging portions 4 and the base portion 5 contacts with the inner faces of the flanges F and F' below the carcass C as illustrated in Fig. 2 and the marginal portions or beads 8 of the carcass rest upon the outer end portions of the diverging portions 4, the extremities of said diverging portions 4 and the adjacent portions of the convolutions A being spaced from the carcass C and free of contact.

When the spring S is in applied position within the carcass C, I find it of especial importance to interpose between the tread portion of the spring S and the carcass C a continuous shield 9 preferably formed of thin steel or other pliable material. The shield 9 serves to protect the carcass against injury from the convolutions A and also prevents the convolutions from being strained especially when the tire comes into contact with an unusually sharp article as it will be at once self evident that the shield 9 will prevent the force of the blow from being received by a single convolution A but on the contrary will distribute the force of the same to adjacent convolutions A.

When a wheel having my improved tire structure applied thereto is under load, the weight will be imposed not only upon the tread portion of the convolutions A of the spring but also upon the diverging portions 4 of the convolutions which affords additional resiliency. Furthermore, it is to be understood that by having the diverging portions 4, or more particularly the inner ends thereof, free of the carcass and out of contact therewith, the ordinary vibration incident to travel will be compensated for by said diverging portions 4 so that greater resistance may be offered by the convolutions A of the spring in the event of an unusual shock or jar being imposed upon the tire. This action also results in the prolongation of the life of the tire structure and more particularly the spring S.

From the foregoing description, it is thought to be obvious that a tire structure constructed in accordance with an embodiment of my invention is particularly well adapted for use by reason of the convenience and facility with which it may be assembled and operated and it will also be obvious that my invention is susceptible of some change and modification without materially departing from the appearance and spirit thereof and for this reason I do not wish to be understood as limiting myself to the precise arrangement and formation of the several parts herein shown in carrying out my invention in practice except as hereinafter claimed.

I claim:

In combination with the rim of a wheel having side flanges, a carcass disposed around the rim and having its marginal portions engaged with the side flanges thereof, a continuous coiled spring arranged within the carcass and disposed circumferentially of the rim, each of the convolutions of the spring having its outer portion substantially circular in form and terminating in diverging portions, said diverging portions being continued by a base portion disposed transversely of the rim and in contact therewith, the junction of each of said diverging portions and the base portion being in contact with the flanges of the rim, and the inner extremities of the diverging portions and the adjacent portions of the circular portions of the convolutions being free of the carcass and out of contact, said diverging portions initially flexing when the wheel is under load.

In testimony whereof I hereunto affix my signature in the presence of two witnesses.

FRANK H. LOPEZ.

Witnesses:
C. D. KESTER,
WALTER TRACY.

Copies of this patent may be obtained for five cents each, by addressing the "Commissioner of Patents, Washington, D. C."